United States Patent Office 2,965,498
Patented Dec. 20, 1960

2,965,498

METHOD OF REDUCING THE SWELLING CAPACITY OF SYNTHETIC ALGINATE SKINS

Mathilde Hartwig, Bomlitz, near Walsrode, and Heinz Reissmann, Fallingsbostel, near Walsrode, Germany, assignors, by mesne assignments, to American Viscose Corporation, Philadelphia, Pa.

No Drawing. Filed July 16, 1958, Ser. No. 748,780

7 Claims. (Cl. 99—176)

The invention relates to a method of reducing the swelling capacity of synthetic skins made from alginates. It is a continuation-in-part of our application Ser. No. 594,080, now abandoned.

In recent years edible synthetic sausage skins made from an alginate, more particularly calcium alginate, have steadily increased in importance because the demand for edible casings can no longer be entirely satisfied by natural products and because the synthetic alginate skin has several advantages over natural gut. First, alginate casings can be produced in the form of tubes of any length which are of uniform diameter of the cylindrical shape produced by filling, far superior to any natural skin. Furthermore, transportation and storage of the synthetic product is simplified. Also, the alginate casing is sterile as such, a property which does not apply to natural gut with the result that in the summer months cans containing sausage having natural gut casings frequently break open. Moreover, in eating the sausages the lesser toughness and improved properties of the alginate skin are an asset.

The present invention aims at further improvements of the properties of the synthetic skin made from alginates by reducing its tendency to swell in a liquid to tolerable limits, for instance, in the case of the small types of sausage sold in tin cans. In the case of sausages preserved in cans in a 3% solution of brine or of sausages which have been subjected to a prolonged period of cooking, the synthetic sausage casing consisting of an alginate which was originally only 0.01 mm. thick, that is to say, no thicker than a natural skin and perhaps even thinner, will swell and undesirably thicken, and its surface will become smooth. The smoothness can be eliminated by the incorporation of animal or vegetable fibers a few tenths of a millimeter in length in the wall of the alginate skin but the tendency of the casing to swell cannot be thereby controlled.

Alginic acid, as is well known, is not resistant to aging in contrast to its salts (cf. McDowell, "Properties of Alginates," London 1954). Upon storage, very slow autohydrolytic degradation sets in. In the presence of free mineral acids, the degradation proceeds at a considerably faster rate. Assuming a practically complete dissociation of the acid (which assumption is permissible for dilute aqueous solutions of strong mineral acids), the speed of degradation is determined by (a) The concentration of the acid,
(b) The temperature.

If $a$ and $b$ are held constant, the degradation rate is a function of the time. This is true only, however, if acids or acid concentrations are employed which have no oxidizing, substituting, dehydrating nor decarboxylating action. This means that only polymer-homologous reactions of the degradation are to be considered which are due to the splitting of the glucoside structure of the mannuronic acid units; not, however, any polymer-analogous reactions or even destruction of the basic units.

Under otherwise equal conditions, the kind and origin of the alginate also affects the degradation. It is known that alginates derived from different types vary somewhat in their composition albeit they all consist to the largest extent of 3-1,4-polymannuronic acid.

According to the present invention, it is possible arbitrarily to reduce the swelling capacity of synthetic skins made from alginates in a liquid, and more particularly in dilute solutions of brine, by partially or entirely converting into free alginic acid the alginate skins which has been precipitated with a solution of an alkaline earth salt, by treating said skin with an acid, and then re-converting the alginic acid into the calcium alginate by a further treatment in solutions of calcium salts. Experiments have shown that it is not absolutely essential to convert all the alginate into free acid, and that it suffices to have at least 75% and preferably about 85% of the free acid present.

The method according to the present invention can be carried out, for instance, in such a manner that a skin is formed by precipitating the alginate from an aqueous sodium alginate solution in a calcium salt solution and then transforming into the free alginic acid by means of an acid which is stronger than alginic acid. The skin consisting wholly or partly of alginic acid is then washed in water and the greater part of the adhering acid removed, whereupon it is re-converted into the calcium alginate by a further treatment in a solution of calcium chloride. It has been found advantageous to accelerate the reaction by the addition of calcium hydroxide to the solution. When all the free acid has been re-transformed into calcium alginate, the skin is washed and treated in the conventional manner with a plasticizer such as a solution of glycerol.

In the baths in which the synthetic alginate skin tends to shrink, the skin must be subjected to hydrostatic pressure to counteract this tendency. The simplest procedure is to fill the inside of the casing with the liquid of the bath and thereby to blow it up in the transverse direction. Compared with an ordinary alginate skin, the swelling capacity of an alginate casing prepared in accordance with the present invention is reduced by about 40%. If a further reduction should be desired, the method can be repeated any desired number of times. However, practical experience has shown that, generally speaking, one single treatment is sufficiently effective to reduce the swelling capacity to within acceptable limits.

As is known, weaker acids can be liberated from their salts by stronger acids. Consequently, all acids should be suited in principle for the process according to the invention which are stronger than alginic acid provided they comply with the other conditions set forth above. The dissociation constant K of alginic acid is $$K = 1.12 \times 10^{-3} \text{ (McDowell, l.c.)}$$

Therefore, the mineral acids $HCl$, $HNO_3$, $H_2SO_4$, $H_3PO_4$, and others can be used. However, other acids also may be employed, e.g., Trichloroacetic acid $K = 2 \times 10^{-1}$
Dichloroacetic acid $K = 3.3 \times 10^{-2}$
Benzenesulfonic acid $K = 2 \times 10^{-1}$ In the case of $H_2SO_4$ and $H_3PO_4$, named as examples, the anion reacts with Ca with formation of difficultly soluble salts. Therefore, the use of these acids, though feasible in principle, is not practical since washing of those calcium salts requires rather large quantities of water, and because the difficultly soluble calcium salts are embedded in the casing and may detract from its stability.

The acid treatment of the sausage casing and the subsequent reconversion to calcium alginate effects a decrease in the swelling ability. An increase in stability can also be noted provided that the degradation has not proceeded too far. Degradation always occurs by this acid treatment, but can be regulated by the reaction conditions. Using, for instance a 2 n HCl at 20° C. and allowing the casing to dwell therein for 10 minutes, the degradation of the alginate is approximately 33 percent. At higher degradation rates, the stabilization may decrease instead of increasing. Further examples of a suitable conversion of calcium alginate to alginic acid at a conversion rate of at least 75 percent with a degradation of 20 to 40 percent are shown in Table 1:

TABLE 1

| No. | Acid | Conc. | t. (° C.) | Time (Min.) |
|---|---|---|---|---|
| 1 | HCl | 2 n | 40 | 3 |
| 2 | HCl | 4 n | 20 | 5 |
| 3 | HNO₃ | 1 n | 20 | 18 |
| 4 | HNO₃ | 1 n | 40 | 5 |
| 5 | CCl₂COOH | 3 n | 20 | 8 |
| 6 | CCl₃COOH | 3 n | 30 | 5 |
| 7 | H₂SO₄ | 1 n | 50 | 2 |
| 8 | H₃PO₄ | 2 n | 50 | 2 |
| 9 | HClO₄ | 3 n | 30 | 4 |
| 10 | HNO₃ | 2 n | 20 | 10 |

The examples shown in Table 1 demonstrate that all acids, meeting the above-named requirements, can be used for the process according to the present invention if the right conditions are chosen, i.e., correct concentration of the acid, temperature and reaction time.

The invention now will be described further by the following example, but it should be understood that this is given merely by way of illustration, not of limitation, and that many changes can be made in the details without departing from the spirit of the present invention.

*Example*

An 8% aqueous solution of sodium alginate was extruded from an annular nozzle into a 10% aqueous calcium chloride solution, and the tube thus formed was conducted through a 3% solution of hydrochloric acid. After a few minutes, the tube had been largely converted into the free alginic acid. Surplus acid adhering to the tube was removed by washing in water. The tube was then passed through a bath consisting of a 10% solution of calcium chloride with 1% of calcium hydroxide suspended therein. In the course of a few minutes immersion in this bath, the tube had been re-converted into calcium alginate. After washing out the surplus calcium salt, the calcium alginate tube was exposed to a plasticizing solution containing 15% glycerol and 15% calcium chloride.

Compared with an untreated skin, the alginate sausage casing prepared as described has only about half the swelling capacity when immersed in a 3% solution of brine and the bursting pressure is increased from 180 cm. water column to 240 cm. whereas its dilatability has decreased from 30% to 16%. By repeating the hydrochloric acid and calcium chloride treatments, the swelling capacity can be still further reduced with a concomitant increase in strength and a corresponding diminution in dilatability. The reduction in the dilatability of the skin is a favorable factor inasmuch as the diameter of the synthetic sausage casing is more accurately maintained when it is filled, thereby retaining its cylindrical shape.

What we claim is:

1. A method of reducing the swelling capacity of synthetic skins made from alginates comprising extruding an 8% aqueous solution of sodium alginate in the form of a cylindrical endless wall into a 10% solution of calcium chloride, conducting the tube thus formed through a 3% solution of hydrochloric acid for a period of from about 2 to about 18 minutes at a temperature ranging from about 20 to about 50° C., then washing the tube in water to remove the adhering surplus of acid, passing the converted washed tube through a bath consisting of a 10% solution of calcium chloride with 1% of calcium hydroxide suspended therein and thereby reconverting the whole tube into calcium alginate, washing the reconverted tube in water to remove the surplus of calcium salt and finally treating the calcium alginate tube with a plasticizing solution containing 15% glycerol and 15% calcium chloride.

2. The method as set forth in claim 1, including the steps of repeating the hydrochloric acid and calcium chloride-calcium hydroxide treatments so as to further reduce the swelling capacity of the synthetic skins with a concomitant increase in strength and a corresponding diminution in dilatability.

3. A method as claimed in claim 1 in which at least 75% of the alginate is converted into the free acid.

4. A method of reducing the swelling capacity of synthetic skins made from alginates comprising conducting alginate skins, formed by precipitating alkali metal alginate in a dilute aqueous solution of an alkaline earth metal salt, through a bath consisting essentially of an aqueous solution of an acid selected from the group consisting of hydrochloric, nitric, sulfuric, orthophosphoric, dichloroacetic, trichloroacetic and benzene-sulfonic acids, said acid solution having a normality of from about 1 to about 4 and a temperature of from about 20 to about 50° C., said skins remaining in said bath for a period of from about 2 to about 18 minutes, and then conducting the alginate skins through a bath containing essentially an aqueous solution of calcium chloride at a concentration of about 10% whereby the swelling capacity of said skins is substantially reduced.

5. A method as claimed in claim 4 in which at least 75% of the alginate is converted into alginic acid in said acid bath.

6. A method as claimed in claim 4 in which about 1% calcium hydroxide is present in the bath containing calcium chloride.

7. A method as claimed in claim 4 in which the alginate skins are repeatedly conducted through the acid bath and the calcium chloride bath.

References Cited in the file of this patent

UNITED STATES PATENTS

| 1,348,459 | Swett | Aug. 3, 1920 |
| 2,485,512 | Rose | Oct. 18, 1949 |
| 2,813,034 | Weingand et al. | Nov. 12, 1957 |

FOREIGN PATENTS

| 492,264 | Great Britain | Sept. 13, 1938 |